United States Patent
Enoki et al.

[11] 3,905,995
[45] Sept. 16, 1975

[54] PROCESS FOR THE PRODUCTION OF THIOPHANE DERIVATIVES

[75] Inventors: Kichiji Enoki; Toshio Yao; Keiichi Ishimitsu, all of Takaoka; Keiichi Tsukashima, Tonami; Eiichi Ikari, Takaoka, all of Japan

[73] Assignee: Nippon Soda Company, Limited, Tokyo, Japan

[22] Filed: Jan. 2, 1974

[21] Appl. No.: 429,916

[30] Foreign Application Priority Data

| Dec. 25, 1972 | Japan | 48-2525 |
| Jan. 19, 1973 | Japan | 48-7863 |
| Feb. 19, 1973 | Japan | 48-19214 |
| Mar. 17, 1973 | Japan | 48-31184 |
| July 19, 1973 | Japan | 48-80478 |

[52] U.S. Cl. ................. 260/309.7; 260/309.7 X
[51] Int. Cl.² .............................. C07D 49/34
[58] Field of Search ........................ 260/309.7

[56] References Cited
UNITED STATES PATENTS

| 2,489,236 | 11/1949 | Goldberg et al. | 260/309.7 X |
| 2,571,238 | 10/1951 | Harris et al. | 260/309.7 X |
| 2,579,682 | 12/1951 | Surmatis | 260/309.7 |

FOREIGN PATENTS OR APPLICATIONS

| 968,724 | 12/1950 | France | 260/309.7 |

*Primary Examiner*—Ethel G. Love
*Attorney, Agent, or Firm*—George B. Oujevolk

[57] ABSTRACT

A thiophane derivative of the general formula

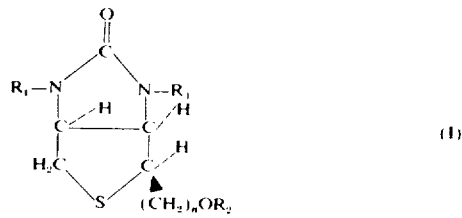

is produced by the reduction of the compound of the general formula

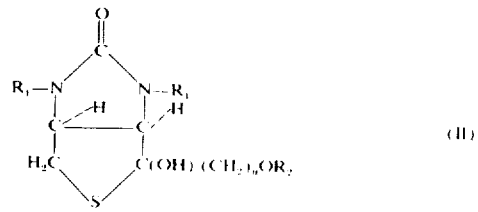

with hydrogen, in the presence of a sulfur resistant nickel catalyst and one or more of auxiliary catalysts selected from the group consisting of aliphatic, aromatic and aralkyl carboxylic acid, esters of said carboxylic acids, Lewis acid, inorganic acid and solid acid catalyst, in an organic solvent.

10 Claims, No Drawings

PROCESS FOR THE PRODUCTION OF THIOPHANE DERIVATIVES

BACKGROUND OF THE INVENTION

The present invention relates to a process for the production of a compound (I) of the general formula

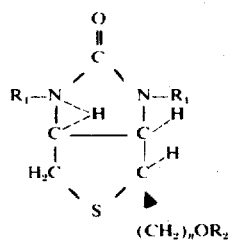

by the reduction of a compound of the general formula

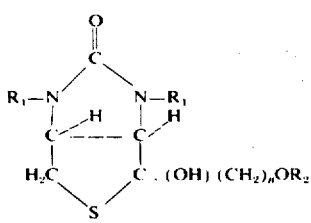

wherein $R_1$ is aralkyl, and $R_2$ is hydrogen, alkyl, aryl or aralkyl, and $n$ is an integer of 1 to 6.

The compound (I) wherein $n$ is 3 or 4 is very useful as an intermediate for the synthesis of biotin (vitamin H).

Hitherto, the compound (I) has not been produced from the compound (II) directly, and was produced by the reduction of a compound (III) of the general formula

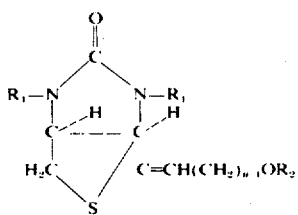

wherein $R_1$ is aralkyl, and $R_2$ is hydrogen, alkyl, aryl or aralkyl, and $n$ is an integer of 1 to 6. The compound (III) was produced by the dehydration reaction of the compound (II). Accordingly, a two-step reaction is the usual process for the production of the compound (I) from the compound (II).

It is the object of the present invention to overcome the aforementioned disadvantage and provide a novel advantageous process for the production of the compound (I).

Other objects and advantages of the present invention will further become apparent hereinafter.

SUMMARY AND DETAILS OF THE INVENTION

The inventors investigated an industrially advantageous synthesis of a compound (I), namely direct production of a compound (I) from a compound (II).

As a result, the inventors found that a compound (I) can be produced directly in a high yield by the reduction of a compound (II) when reducing a compound (II) with hydrogen in an organic solvent in the present of a sulfur resistant nickel catalyst and one or more of auxiliary catalysts selected from the group consisting of aliphatic, aromatic and aralkyl carboxylic acids, esters of said carboxylic acids, Lewis acid, inorganic acid and solid acid catalyst. Then the inventors came to accomplish the present invention.

The present invention is extremely advantageous as an industrial process, because the compound (I) is directly produced from the compound (I) in a high yield and the sulfur resistant nickel catalyst employed for the present invention is inexpensive and easily obtained.

Many kinds of carboxylic acids, esters thereof, Lewis acids, inorganic acids and solid acid catalysts may be used as an auxiliary catalyst in the present invention. The preferable auxiliary catalyst is mentioned below.

An aliphatic carboxylic acid contains 1 to 10 of carbon atom, and the ester of an aliphatic carboxylic acid is a lower alkyl, phenyl or benzyl ester of said aliphatic carboxylic acid, and an aromatic carboxylic acid is benzoic acid or benzoic acid having one or more substituents of lower alkyl, hydroxy, lower alkoxy, amine or carboxy, and aralkyl carboxylic acid is phenyl acetic acid, phenyl propionic acid and said aralkyl carboxylic acids having one or more substituents of lower alkyl, hydroxy, lower alkoxy, amine or carboxy, and esters of said aromatic and aralkyl carboxylic acid are lower alkyl esters thereof, for example, formic acid, acetic acid, propionic acid, caproic acid, caprylic acid, capric acid, crotonic acid, ethyl formate, benzyl formate, ethyl acetate, amyl acetate, phenyl acetate, methyl propionate, ethyl caproate, benzoic acid, toluic acid, salicylic acid, phenyl acetic acid, phenyl propionic acid, aminobenzoic acid, phthalic acid, isophthalic acid, methyl benzoate, dimethyl phthalate or the like.

Lewis acid is, for example, aluminium chloride, zinc chloride, stannic chloride, ferric chloride, titanium tetrachloride, or the like. "Inorganic acid" as used herein means, for example, sulfuric acid, hydrochloric acid, phosphoric acid or the like. A solid acid catalyst is, for example, silica, almina, silica-almina, silica-magnesia or the like.

A mixture of more than two kinds of the auxiliary catalyst may be also used.

Each auxiliary above-mentioned has its own addition amount. An addition amount of an auxiliary catalyst is generaly at least 0.5 wt.%, preferably 1 to 10 wt.% of the amount of a starting material. Even if an addition amount is less than 0.5 wt.%, the reaction may be carried out but the rate of the reaction is slow.

In general, the addition amount of an auxiliary catalyst is mentioned above, but in case of using an inorganic acid, a smaller amount may serve the purpose, namely, an addition amount of an inorganic acid is preferably 0.5 to 1 wt.%. On the contrary an addition amount of a solid acid catalyst is preferably 10 to 40 wt.%.

Special high purity is not required of an auxiliary catalyst employed in the present invention and a product on the market may be used without any treatment.

The sulfur resistant nickel catalyst employed for the present invention may be used by itself as well as in a form where it is supported on a carrier. An addition amount of said nickel catalyst is more than 1 wt.%, preferably 5 to 50 wt.% of an amount of a starting material. Even if the amount of sulfur resistant nickel catalyst is less than 1 wt.%, the reaction may be carried out but the rate of the reaction is so slow that the reaction time becomes long.

An ordinary organic solvent may be used as a solvent of the present invention unless it is inactive for the present reaction and does not act as catalyst poison. For example, aliphatic acid such as acetic acid, propionic acid, caprylic acid or the like, aliphatic alcohol such as methanol, ethanol or the like, ester of aliphatic acid such as ethyl formate, methyl acetate, ethyl acetate, amyl acetate, phenyl acetate, methyl propionate, benzyl formate, ethyl caproate or the like, ester of aromatic carboxylic acid such as methyl benzoate or the like, aromatic hydrocarbon such as benzene, toluene, xylene or the like, cyclic compound such as cyclohexane, dioxane or the like, and ketone such as acetone, methyl ethyl ketone or the like may be used as solvent.

An employed amount of solvent is in the range of 1 to 10 times, preferably 3 to 6 times of the starting material by weight. As a matter of course, the solvent may be used in an amount of more than 10 times, but it is industrially undesirable. A mixed solvent may, of course, be used.

When a compound similar to the aforementioned auxiliary catalyst is used as a solvent as a matter of course, it is unnecessary to add further the auxiliary catalyst, because it is considered that the auxiliary catalyst the employment of which has a distinctive character of the present invention, is already added.

The reaction temperature is generally in a range of 60° to 200°C, preferably 100° to 150°C, though it depends upon a kind of a starting material and other reaction conditions.

The reaction time is generally in a range of 1 to 10 hours and is in a range of 2 to 4 hours under preferable conditions.

The pressure of hydrogen is generally more than 30 kg/cm², preferably 40 to 200 kg/cm², more preferably 80 to 150 kg/cm², though it depends upon a kind of a starting material and other reaction conditions.

When a reaction temperature is lower than 60°C, the rate of the reaction is too slow and the yield decrease. When the reaction temperature is higher than 200°C, the starting material and the product tend to decompose and heating higher than the reaction requires is economically undesirable.

When the pressure of hydrogen is lower than 30 kg/cm², the rate of reaction is too slow. Applying a higher pressure than 200 kg/cm² is economically and industrially undesirable. Such a higher pressure is not required for the present invention.

The present invention makes possible the production of a compound (I) directly from a compound (II) in a high yield and it is industrially advantageous process. The yield is almost quantitative under desirable conditions.

The following examples are included merely to aid in understanding the invention, and variations may be made by one skilled in the art without departing from the spirit and scope of the invention.

EMBODIMENTS OF THE INVENTION

EXAMPLE 1

A mixture of 10 g. of 3,4-(1',3'-dibenzyl-2'-keto-imidazolido)-2-hydroxy-(ω-ethoxypropyl)-thiophane, 50 ml. of acetic acid and 1.5 g of sulfur resistant nickel catalyst was placed in an autoclave made of SUS32, and a hydrogen pressure of 80 kg/cm² applied. The temperature was increased to 140°C and the reaction was carried out during 4 hours. Then the catalyst was removed by filtration and acetic acid was removed by distillation, and 3,4-(1',3'-dibenzyl-2'-keto-imidazolido)-2-(ω-ethoxypropyl)-thiophane was obtained. The yield was quantitative.

(Identification of the product) The total amount of the crude product was dissolved in 50 ml. of acetic acid solution containing 18% hydrobromic acid by weight and allowed to react at a temperature of 60°C during 3 hours. Then, it was evaporated to dryness under reduced pressure. The residue was washed twice with benzene and recrystallized from water to yield 8.6 g. of 3,4-(1',3'-dibenzyl-2'-keto-imidazolido)-1,2-trimethylene-thiophanium bromide. The product was plates melting point of 220° to 222°C. The yield was 82.4% to the starting material having hydroxy group.

Therefore, it was identified as 3,4-(1',3'-dibenzyl-2'-keto-imidazolido)-2-(ω-ethoxypropyl)-thiophane which was one of the objective compounds of the present invention had been produced in a yield of more than 82.4%.

EXAMPLE 2

A mixture of 10 g. of 3,4-(1',3'-dibenzyl-2'-keto-imidazolido) -2-hydroxy-(ω-ethoxypropyl)-thiophane, 40 ml. of toluene, 0.4 g. of acetic acid and 2 g. of sulfur resistant nickel catalyst was allowed to react and treated in the manner described in Example 1. Then, 3,4-(1',3'-dibenzyl-2'-keto-imidazolido) -2-(ω-ethoxypropyl)-thiophane was obtained. The yield was quantitative.

(Identification of the product) The reaction for the identification of the product was carried out as in Example 1 to yield 8.4 g. of 3,4-(1',3'-dibenzyl-2'-keto-imidazolido)-1,2-trimethylene-thiophanium bromide in a yield of 80.5% to the starting material having hydroxy group. Its melting point was 220° to 222°C.

EXAMPLE 3

A mixture of 15 g. of 3,4-(1',3'-dibenzyl-2'-keto-imidazolido) -2-hydroxy-(ω-benzyloxybutyl)-thiophane, 75 ml. of acetic acid and 3 g. of sulfur resistant nickel catalyst was placed in a autoclave made of SUS32 and a hydrogen pressure of 80 kg/cm² applied. The temperature was increased to 150°C and the reaction was carried out during 4 hours. Then after removing the nickel catalyst by filtration and removing solvent by distillation, the residue was recrystallized from a mixture of ether and petroleum ether to yield 14.1 g. of 3,4-(1',3'-dibenzyl-2'-keto-imidazolido) -2-(ω-benzyloxybutyl)-thiophane. The yield was 97.3%. The product was colorless scale crystal and had a melting point of 56° to 58°C.

EXAMPLE 4

A mixture of 10 g. of 3,4-(1',3'-dibenzyl-2'-keto-imidazolido)-2-hydroxy-(ω-phenoxybutyl)-thiophane, 1 g. of formic acid, 40 ml. of xylene and 1 g. of sulfur resistant nickel catalyst was allowed to react as in Example 1 to yield oily 3,4-(1',3'-dibenzyl-2'-keto-imidazolido)-2-(ω-phenoxybutyl)-thiophane. The yield was quantitative.

(Identification of the product) The total amount of the crude product above-mentioned was dissolved in 50 ml. of xylene. After the solution was cooled in a dry ice-methanol bath 60 ml. of liquid ammonia was added to the solution. Then 1 g. of metallic sodium was added with stirring, and when it was confirmed that blue color did not disappear a small amount of ammonium chloride was added in order to decompose excess metallic sodium. After evaporation of liquid ammonia, 5% aqueous sulfuric acid and ether were added to the residue and the product was removed by filtration and washed with water and recrystallized from ethanol to yield 6.5 g. of 3,4-(N-monobenzyl-2'-keto-imidazolido)-2-(ω-phenoxybutyl)-thiophane in a yield of 82.9% to the starting material having hydroxy group. Its melting point was 185° to 186°C.

EXAMPLE 5

A mixture of 10 g. of 3,4-(1',3'-dibenzyl-2'-keto-imidazolido)-2-hydroxy-(ω-methoxybutyl)-thiophane, 50 ml. of propionic acid and 2 g. of sulfur resistant nickel catalyst was allowed to react as in Example 1, to yield 3,4-(1',3'-dibenzyl-2'-ketoimidazolido)-2-(ω-methoxybutyl)-thiophane. The yield was quantitative.

(Identification of the product) The total amount of the crude product above-mentioned was dissolved in 30 ml of xylene, and 60 ml. of liquid ammonia was added with cooling in a dry ice-methanol bath. Then 1.1 g. of metallic sodium was added to the solution with stirring, and when it was confirmed that blue color did not disappear, a small amount of ammonium chloride was added in order to decompose excess of metallic sodium. After evaporation of liquid ammonia, ether and 5% aqueous sulfuric acid were added to the residue, and the product was removed by filtration and washed with water and recrystallized from a mixture of acetone and ether to yield 6 g. of 3,4-(N-monobenzyl-2'-keto-imidazolido)-2-(ω-methoxybutyl)-thiophane in a yield of 79.7% to the starting material having hydroxy group. The product was needles and had a melting point of 143° to 144°C.

EXAMPLE 6

A mixture of 10 g. of 3,4-(1',3'-dibenzyl-2'-keto-imidazolido)-2-hydroxy-(ω-ethoxypropyl)-thiophane, 50 ml. of ether acetate and 2 g. of sulfur resistant nickel catalyst was placed in a autoclave made of SUS32 and a hydrogen pressure of 80 kg/cm² applied. The mixture was allowed to react at a temperature of 150°C, for 4 hours and then the reaction mixture was treated as in Example 1 to yield 3,4-(1',3'-dibenzyl-2'-keto-imidazolido)-2-(ω-ethoxypropyl)-thiophane. The yield was quantitative.

(Identification of the product) The reaction for the identification of the product was carried out as in Example 1 to yield 8.5 g. of 3,4-(1',3'-dibenzyl-2'-keto-imidazolido)-1,2-trimethylene-thiophanium bromide in a yield of 81.6% to the starting material having hydroxy group. The product was plates and had a melting point of 220° to 222°C.

EXAMPLE 7

A mixture of 10 g. of 3,4-(1',3'-dibenzyl-2'-keto-imidazolo)-2-hydroxy-(ω-ethoxypropyl)-thiophane, 50 ml. of phenyl acetate and 2 g. of sulfur resistant nickel catalyst was allowed to react and treated as in Example 6 to yield 3,4-(1',3'-dibenzyl-2'-keto-imidazolido)-2-(ω-ethoxypropyl)-thiopane.

(Identification of the product) The reaction for the identification of the product was carried out as in Example 1 to yield 3,4-(1',3'-dibenzyl-2'-keto-imidazolido)-1,2-trimethylenethiophanium bromide in a yield of 83% to the starting material having hydroxy group. Its melting point was 220° to 222°C.

EXAMPLE 8

A mixture of 10 g. 3,4-(1',3'-dibenzyl-2'-keto-imidazolido)-2-hydroxy-(ω-benzyloxybutyl)-thiophane, 2 g. of sulfur resistant nickel catalyst and 50 ml. of methyl propionate was placed in a autoclave and a hydrogen pressure of 80 kg/cm² applied. The reaction was carried out at a temperature of 140°C during 4 hours. Then, the reaction mixture was treated as in Example 3, to yield 9 g. of 3,4-(1',3'-dibenzyl-2'-keto-imidazolido)-2-(ω-benzyloxybutyl)-thiophane. The yield was 93%. The product was colorless scale crystals and had a melting point of 50° to 58°C.

EXAMPLE 9

A mixture, the composition of which was the same as the one used in Example 8 except containing 50 ml. of benzyl formate instead of methyl propioate, was allowed to react and treated as in Example 8. The desired product 3,4-(1',3'-dibenzyl-2'-keto-imidazolido)-2-(ω-benzyloxybutyl)-thiophane (9.2 g.) was obtained in a yield of 95%. The product was colorless scale crystals and had a melting point of 56° to 58°C.

EXAMPLE 10

A mixture of 10 g. of 3,4-(1',3'-dibenzyl-2'-keto-imidazolido)-2-hydroxy-(ω-phenoxybutyl)-thiophane, 50 ml. of ethyl formate and 1 g. of sulfur resistant nickel catalyst was placed in a autoclave and a hydrogen pressure of 80 kg/cm² applied. The mixture was allowed to react at a temperature of 150°C during 4 hours and then reaction mixture was treated as in Example 1 to yield oily 3,4-(1',3'-dibenzyl-2'-keto-imidazolido)-2-(ω-phenoxybutyl)-thiophane.

(Identification of the product) The reaction for the identification of the product was carried out as in Example 4 to yield 6.4 g. of 3,4-(N-monobenzyl-2'-keto-imidazolido)-2-(ω-phenoxybutyl)-thiophane in a yield of 81.5% to the starting material having hydroxy group. Its melting point was 185° to 186°C.

EXAMPLE 11

A mixture of 10 g. of 3,4-(1',3'-dibenzyl-2'-keto-imidazolido)-2-hydroxy-(ω-methoxybutyl)-thiophane, 50 ml. of amyl acetate and 2 g. of sulfur resistant nickel catalyst was allowed to react and treated as in Example 6 to yield 3,4-(1',3'-dibenzyl-2'-keto-imidazolido)-2-(ω-methoxybutyl)-thiophane.

(Identification of the product) The reaction for the identification of the product was carried out as in Example 4 to yield 6.1 g. of 3,4-(N-monobenzyl-2'-keto-imidazolido)-2-(ω-methoxybutyl)-thiophane in a yield of 81.2% to the starting material having hydroxy group.

The product was needles and had a melting point of 143° to 144°C.

EXAMPLE 12

A mixture, the composition of which was the same as the one used in Example 6 except containing 25 ml. of ethyl acetate and 25 ml. of toluene instead of 50 ml. of ethyl acetate, was allowed to react and treated as in Example 6 to yield 3,4-(1',3'-dibenzyl-2'-keto-imidazolido)-2-(ω-ethoxypropyl)-thiophane.

(Identification of the product) The reaction for the identification of the product was carried out as in Example 1 to yield 3,4-(1',3'-dibenzyl-2'-keto-imidazolido)-1,2-trimethylene-thiophanium bromide in a yield of 81% to the starting material having hydroxy group. Its melting point was 220° to 222°C.

EXAMPLE 13

A mixture of 10 g. of 3,4-(1',3'-dibenzyl-2'-keto-imidazolido)-2-hydroxy-(ω-ethoxypropyl)-thiophane, 50 ml. of caprylic acid and 2 g. of sulfur resistant nickel catalyst was placed in a autoclave and a hydrogen pressure of 80 kg/cm² applied. The mixture was allowed to react at a temperature of 150°C, during 3 hours and then treated as in Example 1 to yield 3,4-(1',3'-dibenzyl-2'-keto-imidazolido)-2-(ω-ethoxypropyl)-thiophane. The yield was quantitative.

(Identification of the product) The reaction for the identification of the product was carried out as in Example 1 to yield 8.7 g. of 3,4-(1',3'-dibenzyl-2'-keto-imidazolido)-1,2-trimethylene-thiophanium bromide in a yield of 83.3% to the starting material having hydroxy group. The product was plates melting at 220° to 222°C.

EXAMPLE 14

A mixture, the composition of which was the same as the one used in Example 13 except containing 10 ml. of caproic acid and 40 ml. of toluene instead of 50 ml. of caprylic acid, was allowed to react and treated as in Example 13 to yield 3,4-(1',3'-dibenzyl-2'-keto-imidazolido)-2-(ω-ethoxypropyl)-thiophane.

(Identification of the product) The reaction for the identification of the product was carried out as in Example 1 to yield 3,4-(1',3'-dibenzyl-2'-keto-imidazolido)-1,2-trimethylene-thiophanium bromide in a yield of 82.5% to the starting material having hydroxy group. Its melting point was 220° to 222°C.

EXAMPLE 15

A mixture, the composition of which was the same as the one used in Example 13 except containing 0.5 g. of benzoic acid and 50 ml. of benzene instead of 50 ml. of caprylic acid, was allowed to react and treated as in Example 13 to yield 3,4-(1',3'-dibenzyl-2'-keto-imidazolido.-2-(ω-ethoxypropyl)-thiophane.

(Identification of the product) The reaction for the identification of the product was carried out as in Example 1 to yield 3,4-(1',3'-dibenzyl-2'-keto-imidazolido)-1,2-trimethylene-thiophanium bromide in a yield of 74.8% to the starting material having hydroxy group. Its melting point was 220° to 222°C.

EXAMPLE 16

A mixture, the composition of which is the same as the one used in Example 13 except containing 1 g. of crotonic acid and 50 ml. of toluene instead of 50 ml. of caprylic acid, was allowed to react and treated as in Example 13 to yield 3,4-(1',3'-dibenzyl-2'-keto-imidazolido)-2-(ω-ethoxypropyl)-thiophane.

(Identification of the product) The reaction for the identification of the product was carried out as in Example 1 to yield 3,4-(1',3'-dibenzyl-2'-keto-imidazolido)-1,2-trimethylene-thiophanium bromide in a yield of 80.8%. Its melting point was 220° to 222°C.

EXAMPLE 17

A mixture of 10 g. of 3,4-(1',3'-dibenzyl-2'-keto-imidazolido)-2-hydroxy-(ω-benzyloxybutyl)-thiophane, 2 g. of sulfur resistant nickel catalyst, 25 ml. of dimethyl phthalate and 25 ml. of toluene was placed in a autoclave and a hydrogen presdure of 80 kg/cm² applied. The mixture was allowed to react at a temperature of 140°C, during 4 hours and then the reaction mixture was treated as in Example 3 to yield 8.6 g. of 3,4-(1',3'-dibenzyl-2'-keto-imidazolido)-2-(ω-benzyloxybutyl)-thiophane. The yield was 89.4%. The product was colorless scale crystals and had a melting point of 56° to 58°C.

EXAMPLE 18

A mixture, the composition of which was the same as the one used in Example 17 except containing 50 ml. of methyl benzoate, instead of 25 ml. of dimethyl phthalate and 25 ml. of toluene, was allowed to react and treated as in Example 3 to yield 3,4-(1',3'-dibenzyl-2'-keto-imidazolido)-2-(ω-benzyloxybutyl)-thiophane. The yield was 94%. The product had a melting point of 56° to 58°C.

EXAMPLE 19

A mixture, the composition of which was the same as the one used in Example 17 except containing 50 ml. of ethyl caproate, instead of 25 ml. of dimethyl phthalate and 25 ml. of toluene, was allowed to react and treated as in Example 3 to yield 3,4-(1',3'-dibenzyl-2'-keto-imidazolido)-2-(ω-benzyloxybutyl)-thiophane. The yield was 90%. The product had a melting point 56° to 58°C.

EXAMPLE 20

A mixture of 10 g. of 3,4-(1',3'-dibenzyl-2'-keto-imidazolido)-2-hydroxy-(ω-phenoxybutyl)-thiophane, 1 g. of p-toluic acid, 50 ml. of toluene and 2 g. of sulfur resistant nickel catalyst was allowed to react and treated as in Example 13 to yield oily 3,4-(1',3'-dibenzyl-2'-keto-imidazolido)-2-(ω-phenoxybutyl)-thiophane. The yield was quantitative.

(Identification of the product) The reaction for the identification of the product was carried out as in Example 4 to yield 6.3 g. of 3,4-(N-monobenzyl-2'-keto-imidazolido)-2-(ω-phenoxybutyl)-thiophane in a yield of 80.5% to the starting material having hydroxy group. Its melting point was 185° to 186°C.

EXAMPLE 21

A mixture, the composition of which was the same as the one used in Example 20 except containing 1 g. of 3-phenyl propionic acid instead of 1 g. of p-toluic acid, was allowed to react and treated as in Example 13 to yield 3,4-(1',3'-dibenzyl-2'-keto-imidazolido)-2-(ω-phenylbutyl)-thiophane.

(Identification of the product) The reaction for the identification of the product was carried out as in Example 4 to yield 3,4-(N-monobenzyl-2'-keto-imidazolido)-2-phenoxybutyl)-thiophane in a yield of 79.0% to the starting material having hydroxy group. Its melting point was 185° to 186°C.

EXAMPLE 22

A mixture, the composition of which was the same as the one used in Example 20 except containing 1 g. of isophthalic acid instead of 1 g. of p-toluic acid, was allowed to react and treated as in Example 13 to yield 3,-4-(1',3'-dibenzyl-2'-ketoimidazolido)-2-(ω-phenoxybutyl)-thiophane.

(Identification of the product) The reaction for the identification of the product was carried out as in Example 4 to yield 3,4-(N-monobenzyl-2'-keto-imidazolido)-2-(ω-phenoxybutyl)-thiophane in a yield of 81.5% to the starting material having hydroxy group. Its melting point was 185° to 186°C.

EXAMPLE 23

A mixture of 10 g. of 3,4-(1',3'-dibenzyl-2-keto-imidazolido)-2-hydroxy-(ω-methoxybutyl)-thiophane, 1 g. of salicylic acid, 50 ml. of toluene and 2 g. of sulfur resistant nickel catalyst was allowed to react and treated as in Example 13 to yield 3,4-(1',3'-dibenzyl-2'-keto-imidazolido)-2-(ω-methoxybutyl)-thiophane. The yield was quantitative.

(Identification of the product) The reaction for identification of the product was carried out as in Example 5 to yield 6.1 g. of 3,4-(N-monobenzyl-2'-keto-imidazolido)-2-(ω-methoxybutyl)-thiophane which was needles melting at 143° to 144°C. The yield was 81.2% to the starting material having hydroxy group.

EXAMPLE 24

A mixture, the composition of which was the same as the one used in Example 23 except containing 2 g. of m-amino benzoic acid instead of 1 g. of salicylic acid, was allowed to react and treated as in Example 13 to yield 3,4-(1',3'-dibenzyl-2'-ketoimidazolido)-2-(ω-methoxybutyl)-thiophane.

(Identification of the product) The reaction for the identification of the product was carried out as in Example 5 to yield 3,4-(N-monobenzyl-2'-keto-imidazolido)-2-(ω-methoxybutyl)-thiophane which melted at 143° to 144°C. The yield was 79.7% to the starting material having hydroxy group.

EXAMPLE 25

A mixture of 10 g. of 3,4-(1',3'-dibenzyl-2'-keto-imidazolido)-2-hydroxy-(ω-ethoxypropyl)-thiophane, 2 g. of zinc chloride, 2 g. of sulfur resistant nickel catalyst and 50 ml. of toluene was allowed to react and treated as in Example 13 to yield 3,4-(1',3'-dibenzyl-2'-keto-imidazolido)-2-(ω-ethoxypropyl)-thiophane. The yield was quantitative.

(Identification of the product) The reaction for the identification of the product was carried out as in Example 1 to yield 8.55 g. of 3,4-(1',3'-dibenzyl-2'-keto-imidazolido)-1,2-trimethylene-thiophanium bromide which was plates melting at 220° to 222°C. The yield was 81.8% to the starting material having hydroxy group.

EXAMPLE 26

A mixture of 10 g. of 3,4-(1',3'-dibenzyl-2'-keto-imidazolido)-2-hydroxy-(ω-benzyloxybutyl)-thiophane, 0.5 g. of aluminium chloride, 2 g. of sulfur resistant nickel catalyst and 50 ml. of xylene was allowed to react and treated as in Example 8 to yield 9.45 g. of 3,4-(1',3'-dibenzyl-2'-keto-imidazolido)-2-(ω-benzyloxybutyl)-thiophane. The yield was 97.7%. The product was colorless scales melting at 56° to 58°C.

EXAMPLE 27

A mixture, the composition of which was the same as the one used in Example 25 except containing 1 g. of titanium tetrachloride instead of 2 g. of zinc chloride, was allowed to react and treated as in Example 13 to yield 3,4-(1',3'-dibenzyl-2'-keto-imidazolido)-2-(ω-ethoxypropyl)-thiophane.

(Identification of the product) The reaction for the identification of the product was carried out as in Example 1 to yield 3,4-(1',3'-dibenzyl-2'-keto-imidazolido)-1,2-trimethylene-thiophanium bromide which melted at 220° to 222°C. The yield was 79.4% to the starting material having hydroxy group.

EXAMPLE 28

A mixture of 10 g. of 3,4-(1',3'-dibenzyl-2'-keto-imidazolido)-2-hydroxy-(ω-phenoxybutyl)-thiophane, 2 g. of stannic chloride, 50 ml. of xylene and 1 g. of sulfur resistant catalyst was allowed to react and treated as in Example 13 to yield oily 3,4-(1',3'-dibenzyl-2'-keto-imidazolido)-2-(ω-phenoxybutyl)-thiophane.

(Identification of the product) The reaction for the identification of the product was carried out as in Example 4 to yield 6.3 g. of 3,4-(N-monobenzyl-2'-keto-imidazolido)-2-(ω-phenoxybutyl)-thiophane which was needles melting at 185° to 186°C. The yield was 80.4% to the starting material having hydroxy group.

EXAMPLE 29

A mixture of 10 g. of 3,4-(1',3'-dibenzyl-2'-keto-imidazolido)-2-hydroxy-(ω-methoxybutyl)-thiophane, 1 g. of ferric chloride, 1.5 g. of sulfur resistant nickel catalyst and 50 ml. of xylene was allowed to react and treated as in Example 13 to yield 3,4-(1',3'-dibenzyl-2'-keto-imidazolido)-2-(ω-methoxybutyl)-thiophane.

(Identification of the product) The reaction for the identification of the product was carried out as in Example 4 to yield 6.05 g. of 3,4-(N-monobenzyl-2'-keto-imidazolido)-2-(ω-methoxybutyl)-thiophane which was needles melting at 143° to 144°C. The yield was 80.4% to the starting material having hydroxy group.

EXAMPLE 30

A mixture of 10 g. of 3,4-(1',3'-dibenzyl-2-keto-imidazolido)-2-hydroxy-(ω-ethoxypropyl)-thiophane, 50 ml. of toluene, 0.05 ml. of sulfuric acid and 2 g. of sulfur resistant nickel catalyst was allowed to react and treated as in Example 13 to yield 3,4-(1',3'-dibenzyl-2'-keto-imidazolido)-2-(ω-ethoxypropyl)-thiophane. The yield was quantitative.

(Identification) of the product) The reaction for the identification of the product was carried out as in Example 1 to yield 7.8 g. of 3,4-(1',3'-dibenzyl-2'-keto-imidazolido)-1,2-trimethylene-thiophanium bromide which was plates melting at 220° to 222°C. The yield was 74.8% to the starting material having hydroxy group.

EXAMPLE 31

A mixture of 10 g. of 3,4-(1',3'dibenzyl-2'-keto-imidazolido)-2-hydroxy-(ω-phenoxybutyl)-thiophane, 50 ml. of toluene, 0.05 ml. of phosphoric acid and 2 g. of sulfur resistant nickel catalyst was allowed to react and treated as in Example 13 to yield oily 3,4-(1',3'-dibenzyl-2'-keto-imidazolido)-2-(ω-phenoxybutyl)-thiophane. The yield was quantitative.

(Identification of the product) The reaction for the identification of the product was carried out as in Example 4 to yield 6.1 g. of 3,4-(N-monobenzyl-2'-ketoimidazolido)-2-(ω-phenoxybutyl)-thiophane which was needles melting at 185° to 186°C. The yield was 77.6% to the starting material having hydroxy group.

EXAMPLE 32

A mixture of 10 g. of 3,4-(1',3'-dibenzyl-2'-keto-imidazolido)-2-hydroxy-(ω-methoxybutyl)-thiophane, 50 ml. of benzene, 0.1 ml. of concentrated hydrochloric acid and 2 g. of sulfur resistant nickel catalyst was allowed to react and treated as in Example 13 to yield 3,4-(1',3'-dibenzyl-2'-keto-imidazolido)-2-(ω-methoxybutyl)-thiophane. The yield was quantitative.

(Identification of the product) The reaction for the identification of the product was carried out as in Example 5 to yield 5.8 g. of 3,4-(N-monobenzyl-2'-keto-imidazolido)-2-(ω-methoxybutyl)-thiophane which was needles melting at 143° to 144°C. The yield was 77.4% to the starting material having hydroxy group.

EXAMPLE 33

A mixture of 10 g. of 3,4-(1',3'-dibenzyl-2'-keto-imidazolido)-2-hydroxy-(ω-benzyloxybutyl)-thiophane, 50 ml. of benzene, 4 g. of silica-almina (Trade name N631 - HN, manufactured from Nikki Kagaku Co.) and 2 g. of sulfur resistant nickel catalyst was allowed to react and treated as in Example 3 except that a hydrogen pressure of 100 kg/cm² was applied.

Colorless scale crystals of 3,4-(1',3'-dibenzyl-2'-ketoimidazolido)-2-(ω-benzyloxybutyl)-thiophane (8.6 g.) was obtained in a yield of 88.9%. Its melting point was 56° to 58°C.

What is claimed is:

1. A process for the production of a compound having the general formula

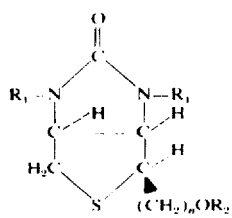

(I)

wherein $R_1$ is benzyl, and $R_2$ is selected from the group consisting of alkyl, phenyl and benzyl, and $n$ is an integer of 1 to 6, which comprises reducing a starting material selected from the compound having the general formula

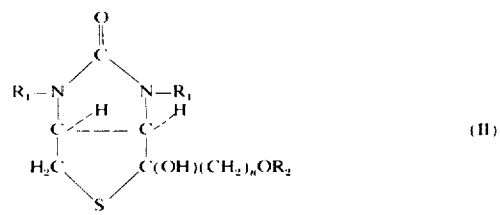

(II)

with hydrogen in the presence of sulfur resistant nickel catalyst and one or more of auxiliary catalysts selected from the group consisting of aliphatic, aromatic and aralkyl carboxylic acids, esters thereof, Lewis acids, inorganic mineral acids and solid inorganic acid catalysts in an organic solvent or a mixed organic solvent at a temperature of 60° to 200°C under a hydrogen pressure of more than 30 kg/cm².

2. A process according to claim 1, wherein the aliphatic carboxylic acid contains 1 to 10 of carbon atoms, and the ester of the aliphatic carboxylic acid is selected from the group consisting of lower alkyl, phenyl and benzyl ester of said aliphatic carboxylic acid, and the aromatic carboxylic acid is selected from the group consisting of benzoic acid and benzoic acid having a substituent or substituents selected from the group consisting of lower alkyl, hydroxy, amine and carboxy, and the aralkyl carboxylic acid is selected from the group consisting of phenyl acetic acid, phenyl propionic acid and said aralkyl carboxylic acids having a substituent or substituents on the phenyl moiety of said acid selected from the group consisting of lower alkyl, hydroxy, amine and carboxy, and esters of said aromatic and aralkyl carboxylic acid are lower alkyl esters thereof, and said Lewis acid is selected from the group consisting of aluminium chloride, zinc chloride, stannic chloride, ferric chloride and titanium tetrachloride, and the inorganic acid is selected from the group consisting of sulfuric acid, hydrochloric acid and phospholic acid, and said solid acid catalyst is selected from the group consisting of silica, alumina, silicaalumina and silica-magnesia.

3. A process according to claim 1, wherein $R_2$ is selected from the group consisting of methyl, ethyl, phenyl and benzyl.

4. A process according to claim 2, wherein the amount added of the auxiliary catalysts is at least 0.5 wt.% of the amount of the starting material.

5. A process according to claim 4, wherein the amount added of the auxiliary catalysts is in a range of 1 to 10 wt.% of the amount of the starting material.

6. A process according to claim 1, wherein the amount added of sulfur resistant nickel catalyst is more than 1 wt.% of the amount of the starting material.

7. A process according to claim 6, wherein the amount added of sulfur resistant nickel catalyst is in a range of 5 to 50 wt.% of the amount of the starting material.

8. A process according to claim 1, wherein the reaction temperature is in a range of 100° to 150°C.

9. A process according to claim 1, wherein the pressure of hydrogen is in a range of 40 to 200 kg/cm².

10. A process according to claim 9, wherein the pressure of hydrogen is in a range of 80 to 150 kg/cm².

* * * * *